(12) United States Patent
Kitani et al.

(10) Patent No.: US 6,305,170 B1
(45) Date of Patent: Oct. 23, 2001

(54) ENGINE WASTE HEAT RECOVERING APPARATUS

(75) Inventors: Hiroyuki Kitani; Yoshinori Nakagawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,716

(22) Filed: Oct. 25, 2000

(30) Foreign Application Priority Data

Nov. 1, 1999 (JP) .................................................. 11-311249

(51) Int. Cl.$^7$ ...................................................... F02G 3/00
(52) U.S. Cl. .................................................. 60/614; 60/616
(58) Field of Search .............................. 60/597, 614, 616

(56) References Cited

U.S. PATENT DOCUMENTS

| | | | |
|---|---|---|---|
| 3,092,958 | * 6/1963 | Duncan | 60/616 X |
| 3,986,575 | * 10/1976 | Eggmann | 60/616 X |
| 5,056,315 | * 10/1991 | Jenkins | 60/614 |

* cited by examiner

Primary Examiner—Hoang Nguyen
(74) Attorney, Agent, or Firm—Armstrong, Westerman, Hattori, McLeland & Naughton, LLP (57) ABSTRACT

An exhaust gas released from the exhaust gas heat exchanger 9 is conveyed into the inlet of a bend 32 communicated to a silencer 31. The exhaust gas mixed with the condensed water is upwardly passed as a mixture fluid through a passage 322 and forced into a first expansion chamber 323. The mixture fluid is separated into the exhaust gas and the condensed water in the chamber 323 and conveyed downwardly in a passage 324 provided with a second expansion chamber 325. While the exhaust gas is forced upwardly from the lower end of the silencer 31, the condensed water is discharged downwardly. The condensed water is conveyed in the drain passage of a waster water trap and released to the outside.

8 Claims, 7 Drawing Sheets

ENGINE WASTE HEAT RECOVERING APPARATUS

BACKGROUND OF THE INVENTION

1. Field of the Invention

The present invention relates to an engine waste heat recovering apparatus and particularly to an apparatus recovering heat generated by engine used as a power source in a cogeneration system.

2. Description of the Related Art

As the need for global environmental protection has been focused, cogeneration system are widely proposed for generation of electric power and supply of hot water with the use of a gas engine as the power source which consumes city gas and the like as a fuel. Such a type of cogeneration systems are preferably featured for recovering heat not only from the engine but also from its exhaust gas through conveying a thermal medium to an exhaust gas heat exchanger.

As the exhaust gas heat exchanger permits the exhaust gas to be cooled down by the function of heat exchanging with the thermal medium and release condensed water, there is a mixture of the exhaust gas and the condensed water at its outlet. In general, the mixture is conveyed through a conduit to a silencer where it is separated into the exhaust gas and the condensed water. However, the condensed water is often trapped at the inlet of the silencer. As the exhaust gas is continuously conveyed into the silencer, it runs through and may lift up a part of the trapped condensed water which has a tendency to flow down along the bottom of the silencer due to the gravity force hence producing a sound (harshnoise) of blowing up. Also, portions of the condensed water may be discharged together with the exhaust gas from the silencer.

SUMMARY OF THE INVENTION

The present invention has been developed in view of the above drawback and its object is to provide an engine waste heat recovering apparatus adapted for inhibiting the production of the blowing sound caused by condensed water which is separated from the exhaust gas and trapped about at the inlet of a silencer while making the separation of the condensed water from the exhaust gas easy.

As a first feature of the present invention, an engine waste heat recovering apparatus having an exhaust gas heat exchanger for recovering heat from the exhaust gas of the engine and a drain passage for discharging the condensed water produced due to the function of heat exchange in the exhaust gas heat exchanger, comprising, a lift-up passage extending upwardly from the exhaust gas heat exchanger, an expansion chamber communicated with an upper end of the lift-up passage, a fall-down passage extending downwardly from the expansion chamber, and an exhaust gas discharge passage communicated with a lower end of the fall-down passage, wherein the drain passage is communicated at its bottom.

As a second feature of the present invention, the fall-down passage is larger than the lift-up passage in a size of the cross sectional area.

As a third feature of the present invention, the expansion chamber is of a horizontally extending tubular form and communicated at one end of its lower wall to an upper end of the lift-up passage and at the other end of its lower wall to an upper end of the fall-down passage.

As a fourth feature of the present invention, the fall-down passage is communicated at its intermediate with a second expansion chamber, and a first passage between the second expansion chamber and the separation chamber is larger than a second passage between the expansion chamber and the second expansion chamber in a size of the cross sectional area.

As a fifth feature of the present invention, the lift-up passage, the expansion chamber, the separation chamber, the exhaust gas discharge passage, and the fall-down passage are in an integral form.

As a sixth feature of the present invention, the lift-up passage, the expansion chamber, the separation chamber, the exhaust gas discharge passage, the fall-down passage, and the second expansion chamber are in an integral form.

As a seventh feature of the present invention, the drain passage includes a waster water trap.

According to the first to seventh features of the present invention, a mixture of the exhaust gas and the condensed water is accelerated at the velocity in the lift-up passage and promptly conveyed to the expansion chamber where it is separated. This allows the condensed water to be conveyed separately of the exhaust gas and hardly be trapped at the inlet of the silencer, thus rarely producing a sound of blowing up. As the mixture of the exhaust gas and the condensed water is forced into the expansion chamber at a high speed, it strikes against the inner wall of the chamber for promoting the separation from each other. The condensed water separated in the expansion chamber is then forced down into the fall-down passage by the pressure of the exhaust gas and then flows smoothly along the passage with the help of the gravity and the pressure of the exhaust gas. In the separation chamber or the lower portion of the exhaust gas discharge passage, the condensed water is discharged to the drain passage by the back pressure as not allowed to stagnate.

According to the second to fourth features of the present invention, the exhaust gas and the condensed water can be conveyed more smoothly. According to the fifth and sixth features, as the passage for conveying the mixture of the exhaust gas and the condensed water, and the exhaust gas discharge passage are formed integral with each other, their fabrication as well as their installation to the waste heat recovering apparatus can be simplified.

According to the seventh feature, the exhaust gas is inhibited from flowing into the drain passage by the condensed water trapped in the waster water trap and readily discharged upwardly through the separation chamber.

DETAILED DESCRIPTION OF THE PREFERRED EMBODIMENTS

Figure 1:
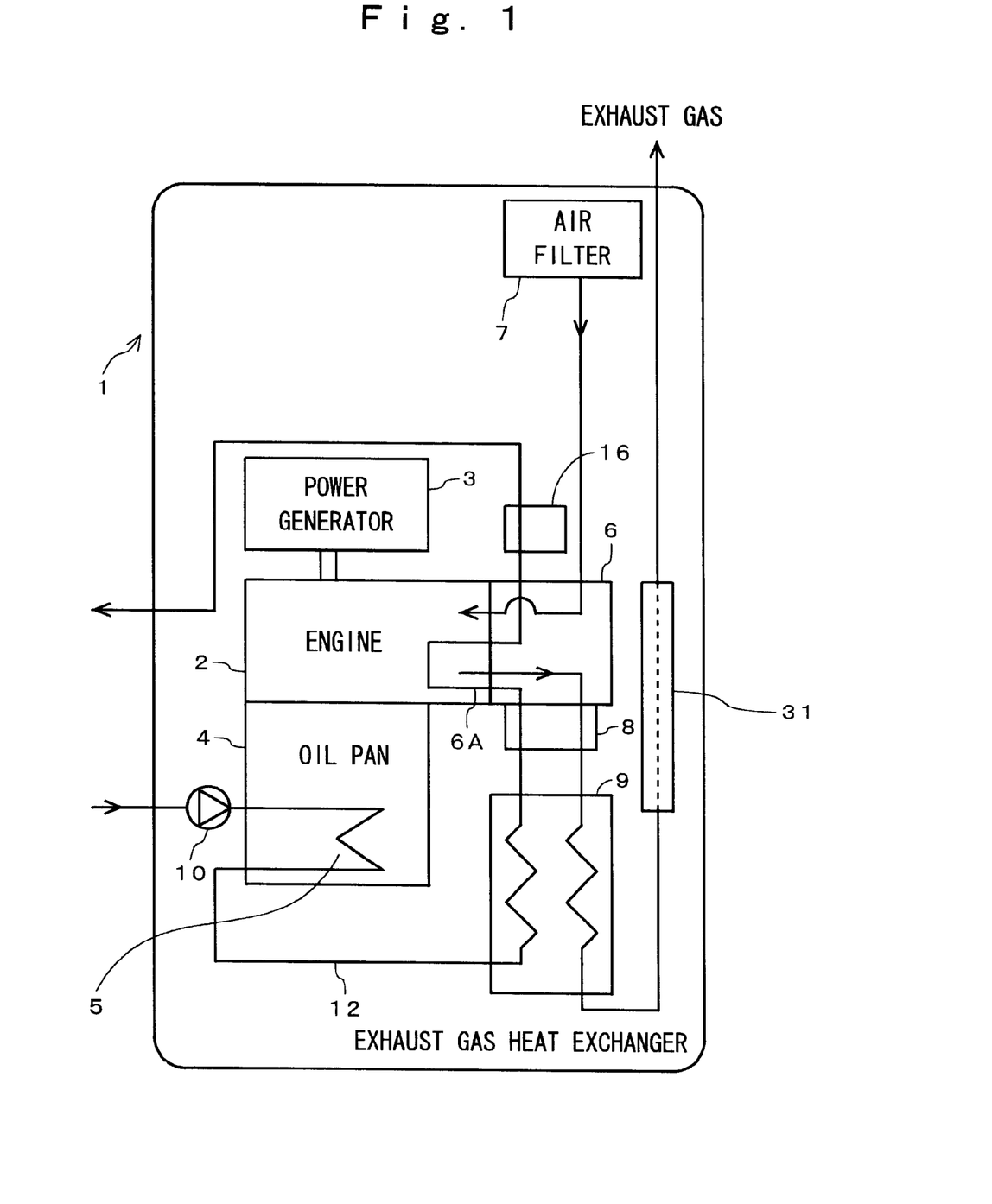
FIG. 1 is a block diagram of a primary part of a waste heat recovering apparatus according to one embodiment of the present invention.

An embodiment of the present invention will be described in more detail referring to the relevant drawings. FIG. 1 is a block diagram showing an arrangement of an engine waste heat recovering apparatus in a cogeneration system. The engine waste heat recovering apparatus 1 is designed for recovering heat from the engine of a power generator. The waste heat recovering apparatus 1 is linked to the engine 2 and the power generator 3 mechanically connected to the engine 2. The power generator 3 generates an alternating current corresponding to the number of revolutions of the engine 2. The engine 2 has an oil pan 4 for storage of lubrication oil. The oil pan 4 includes an oil cooler (an oil heat exchanger) 5 which carries out heat exchange between the oil in the oil pan 4 and the heat transfer medium (a cooling water). A cylinder head 6 of the engine 2 takes air in from an air filter 7. The exhaust gas from the engine 2 is passed through an exhaust gas manifold 8 and an exhaust gas heat exchanger 9 and discharged out from a silencer 31.

For recovering heat generated by the engine 2 at high efficiency, a circulating path 12 for the heat transfer medium is provided. A water pump 10 is mounted at the inlet of the circulating path 12 for circulating the heat transfer medium. This permits the water pump 10 not to meet a high temperature of the heat transfer medium, hence avoiding abrupt degradation of the sealant or the like and increasing the operational life of the water pump 10. The heat transfer medium pumped by the water pump 10 is conveyed through the oil heat exchanger 5 in the oil pan 4, the exhaust gas heat exchanger 9, the engine 2, the cylinder head 6, and a thermo-cover 16 and passed to a thermal load which will be described later. The thermo-cover 16 has a the most at built therein for closing a valve when the temperature is below a predetermined degree to prevent the heat transfer medium from cooling down the engine cylinder.

As the heat transfer medium is circulated in the circulating path 12, it transfers heat generated by the engine 2 to the thermal load. More specifically, the heat transfer medium is conveyed to the oil heat exchanger 5 in the oil pan 4 where it cools down the oil or draws heat from the oil of the engine 2. The heat transfer medium receiving thermal energy at the oil heat exchanger 5 and the exhaust gas heat exchanger 9 and having a higher temperature is further passed through the conduits in the cylinder wall and the cylinder head 6 or the cooling unit of the engine 2 in the form of a water jacket 6A and its temperature rises up.

Figure 2:
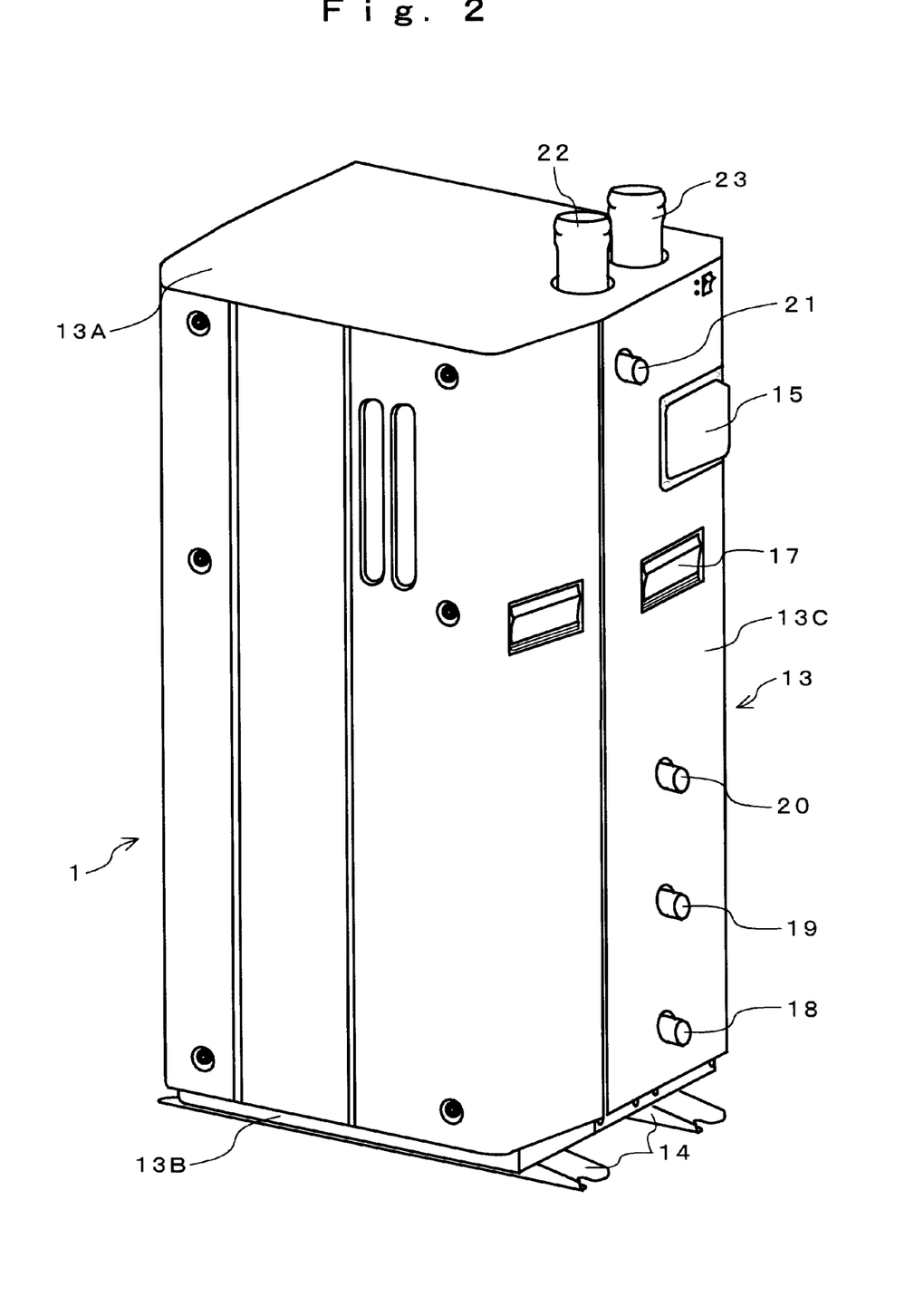
FIG. 2 is an external perspective view of the waste heat recovering apparatus.
Figure 3:
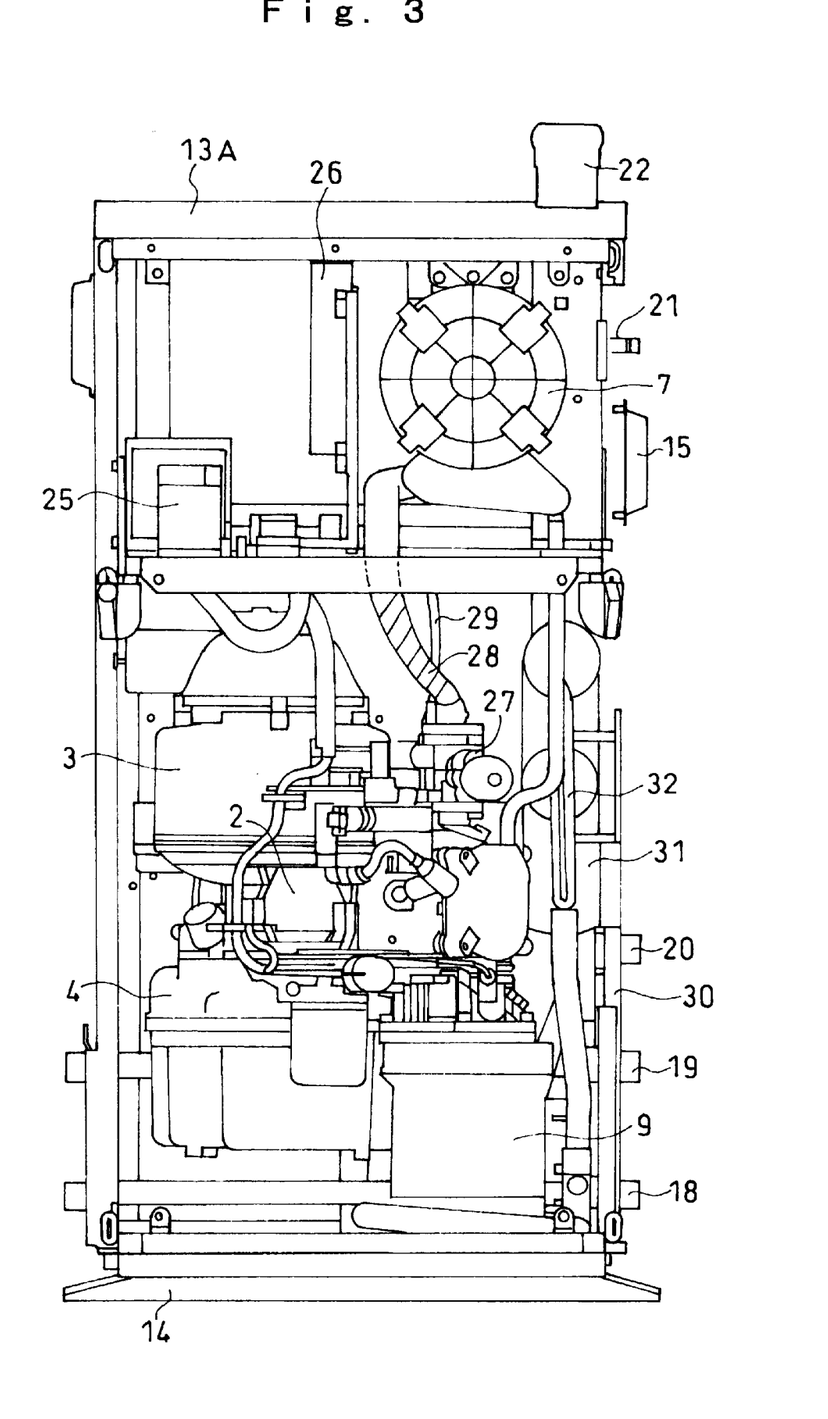
FIG. 3 is a front view of the waste heat recovering apparatus with a case removed off.
Figure 4:
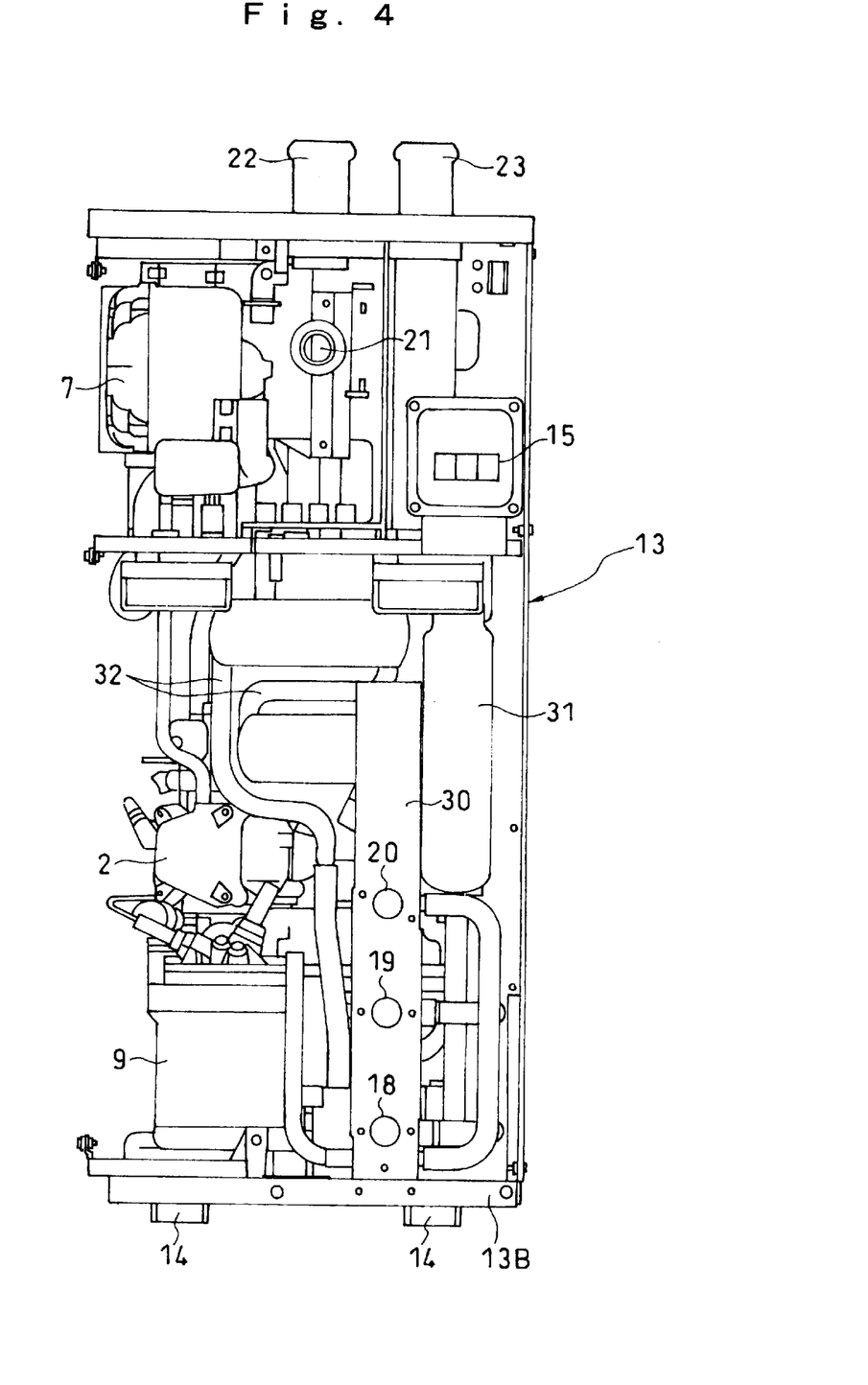
FIG. 4 is a side view of the waste heat recovering apparatus with the case removed off.

FIG. 2 is a perspective view showing the outside of the waste heat recovering apparatus. FIG. 3 is a front view of the waste heat recovering apparatus with its cover partially removed and FIG. 4 is a side view of the same seen from the right. Referring to FIG. 2, the waste heat recovering apparatus 1 is enclosed in a case 13 which comprises a top panel 13A, a bottom panel 13B, and a side panel 13C. The bottom panel 13B has legs 14 while the side panel 13C has an electric power terminal 15 and a grip 17. The side panel 13C also has through holes provided therein for accepting a heat transfer medium inlet pipe 18, a heat transfer medium outlet pipe 19, a condensed water drain pipe 20, and a fuel gas inlet pipe 21. The top panel 13A has holes provided therein for accepting an air intake tube 22 and an exhaust tube 23.

As shown in FIGS. 3 and 4, the air filter 7, a battery 25, and an ECU 26 are located at an upper region, the exhaust gas heat exchanger 9 at a lower region, and the engine 2 at an intermediate region of the waste heat recovering apparatus 1, respectively. The engine 2 is of a vertical type where its crank shaft (not shown) is vertically elongated and connected to the power generator 3. The oil pan 4 is located beneath the engine 2. A mixer 27 is mounted above the cylinder head of the engine 2 and connected to an air intake hose 28 extending from the air filter 27 and a gas pipe 29 extending from a fuel gas inlet pipe 21.

A right side stay 30 is mounted upright on the bottom panel 13B to extend along the side panel 13C. The stay 30 has joints 34, 44 and 38 (described later in more detail) which are provided with the heat transfer medium inlet pipe 18, the heat transfer medium outlet pipe 19, and the condensed water drain pipe 20, respectively. The silencer 31 extends along the right side stay 30 for absorbing noises of the exhaust gas released from the exhaust gas heat exchanger 9. The silencer 31 is communicated to the exhaust tube 23 while the air intake tube 22 is communicated to the air filter 7. The silencer 31 is joined at its inlet with a bent tube 32 for introducing the exhaust gas from the exhaust gas heat exchanger 9 into the interior of the silencer 31.

Figure 5:
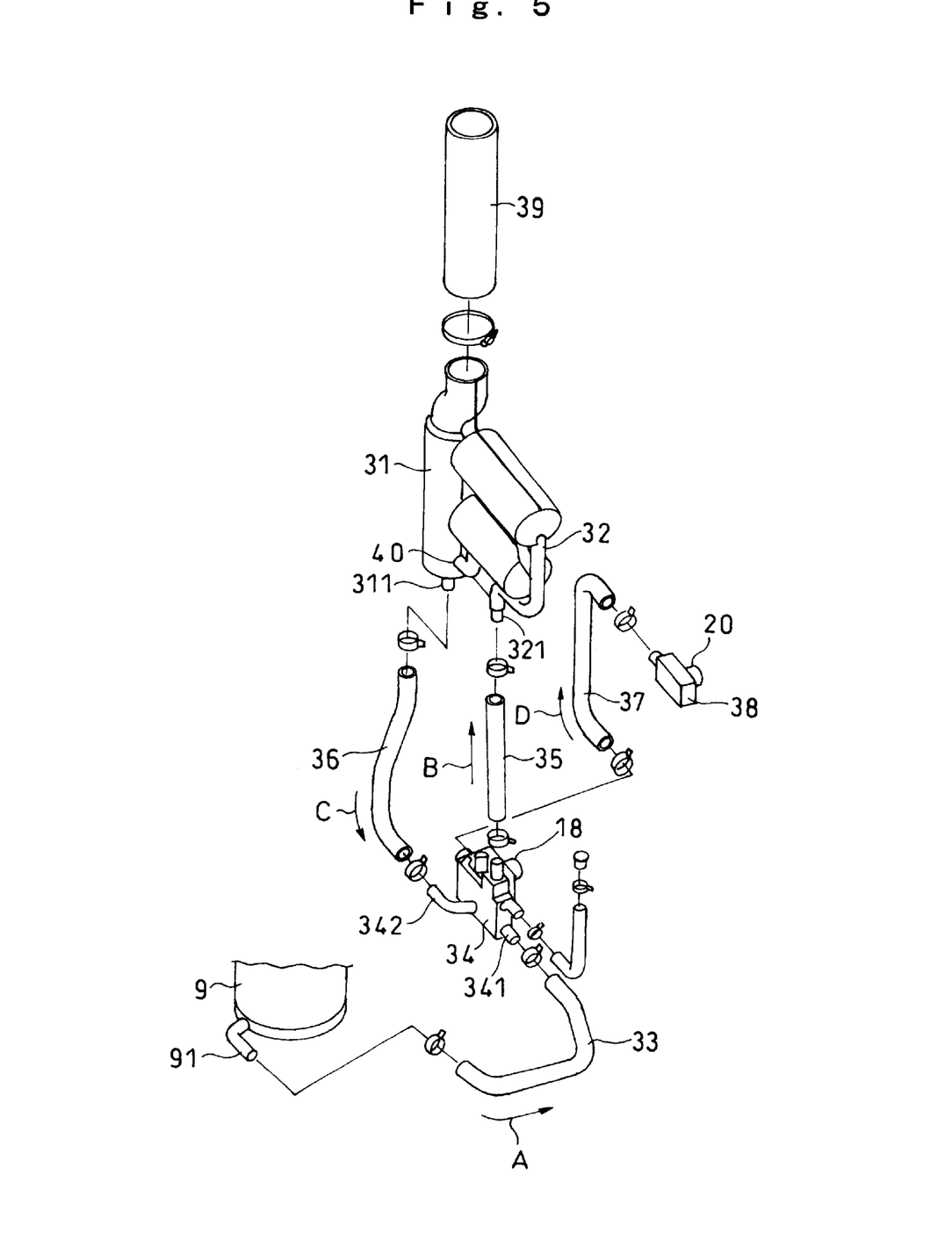
FIG. 5 is an exploded perspective view of the passage of exhaust gas released from an exhaust gas heat exchanger.

FIG. 5 is an exploded perspective view of the piping of an exhaust system. As shown, the exhaust gas heat exchanger 9 is connected with its outlet pipe 91 to one end of the exhaust gas hose 33 which is in turn connected at the other end to a inlet pipe 341 of the first joint 34 which combines the heat transfer medium inlet pipe 18. A silencer inlet hose 35 is connected at one end by the first joint 34 to the exhaust hose 33 and at the other end to the inlet 321 of the bent tube 32 provided at the upstream of the silencer 31. A silencer outlet hose 39 is mounted on the top of the silencer 31 for communicating with the exhaust tube 23.

The drain hose 36 extending from the drain outlet pipe 311 at the lowermost end of the silencer 31 is connected to a inlet pipe 342 of the first joint 34. A drain outlet hose 37 connected by the first joint 34 to the drain hose 36 is communicated with a second joint 38 connected to the condensed water pipe 20. The drain hose 36 and the drain outlet hose 37 constitute a waster water trap extending downwardly from the silencer 31 and then upwardly from the joint 34. The condensed water trapped in the waster water trap inhibits the exhaust gas in the silencer 31 to flow into the waster water trap and makes the upward movement of the exhaust gas easier. The first joint 34, the second joint 38, and the silencer 31 are fixedly mounted to the right side stay 30 (See FIGS. 3 and 6).

In operation, the exhaust gas from the engine 2 is conveyed into the exhaust gas heat exchanger 9 where its thermal energy is transferred to the heat transfer medium circulated in the circulation path 12, hence lowering its temperature. As its temperature drops, the exhaust gas releases the condensed water which is then discharged together with the exhaust gas from the exhaust gas heat exchanger 9. The exhaust gas with the condensed water are passed through the exhaust hose 33, the first joint 34, and the silencer inlet hose 35 and conveyed into the bent tube 32 (as denoted by the arrows A and B in FIG. 5). The bent tube 32 is joined by a joint 40 to a lower region of the side wall of the silencer 31.

The exhaust gas and the condensed water are separated from each other at the joint 40 between the bent tube 32 and the silencer 31. The exhaust gas is passed through the silencer 31 and the silencer outlet hose 39 and discharged out from the exhaust pipe 23. The condensed water separated from the exhaust gas is passed via the drain hose 36, the first joint 34, and the drain outlet hose 37 to the second joint 38 and discharged from the condensed water drain pipe 20 (as denoted by the arrows C and D in FIG. 5).

Figure 6:
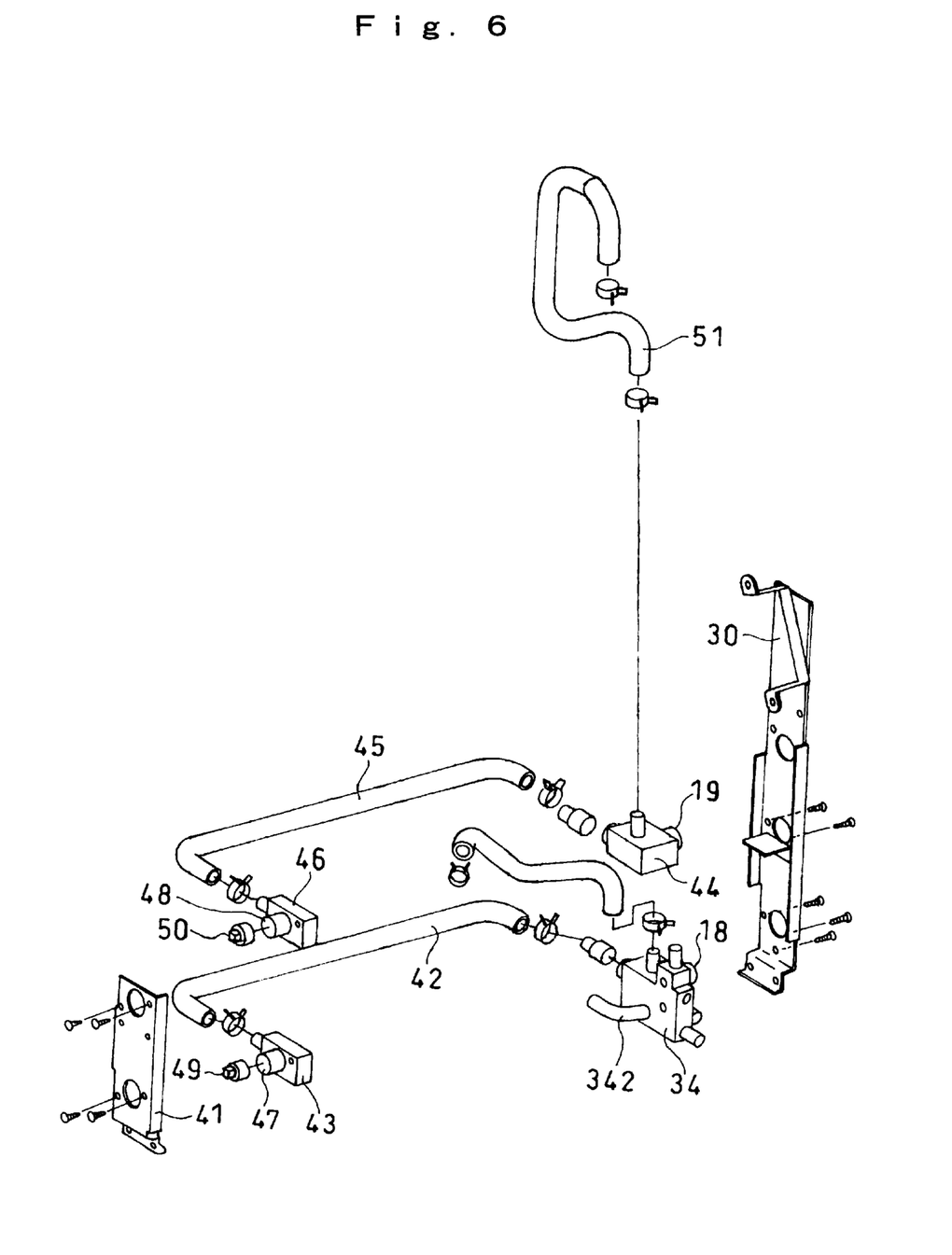
FIG. 6 is an exploded perspective view of a primary part of the circulation path for a thermal medium.

FIG. 6 is an exploded perspective view of the piping of a heat transfer medium circulation system. As shown, a left side stay 41 is provided opposite to the right side stay 30. The left side stay 41 is mounted also upright on the bottom panel 13B. A fourth joint 43 connected by a heat transfer medium inlet hose 42 to the first joint 34 is fixedly mounted to the lower end of the left side stay 41.

A third joint 44 connected with the heat transfer medium outlet pipe 19 is mounted to an intermediate region of the right side stay 30. A fifth joint 46 is mounted to the upper end of the left side stay 41. The third joint 44 and the fifth joint 46 are connected with each other by a heat transfer medium outlet hose 45. The fourth joint 43 and the fifth joint 46 are communicated with a heat transfer medium left inlet pipe 47 and a heat transfer medium left outlet pipe 48, respectively. The fourth joint 43 and the fifth joint 46 are provided for allowing the waste heat recovering apparatus 1 to have the heat transfer medium inlet and outlet located on either a left or right side thereof. When both the heat transfer medium inlet and outlet are located on the right side of the waste heat recovering apparatus 1, the heat transfer medium left inlet pipe 47 and the heat transfer medium left outlet pipe 48 are closed with plugs 49 and 50, respectively. Similarly, when both the heat transfer medium inlet and outlet are located on the left side of the waste heat recovering apparatus 1, the heat transfer medium inlet pipe 18 and the heat transfer medium outlet pipe 19 are closed with plugs 49 and 50, respectively. The third joint 44 is connected with an engine outlet hose 51 extending from the cooling unit of the engine 2.

Figure 7:
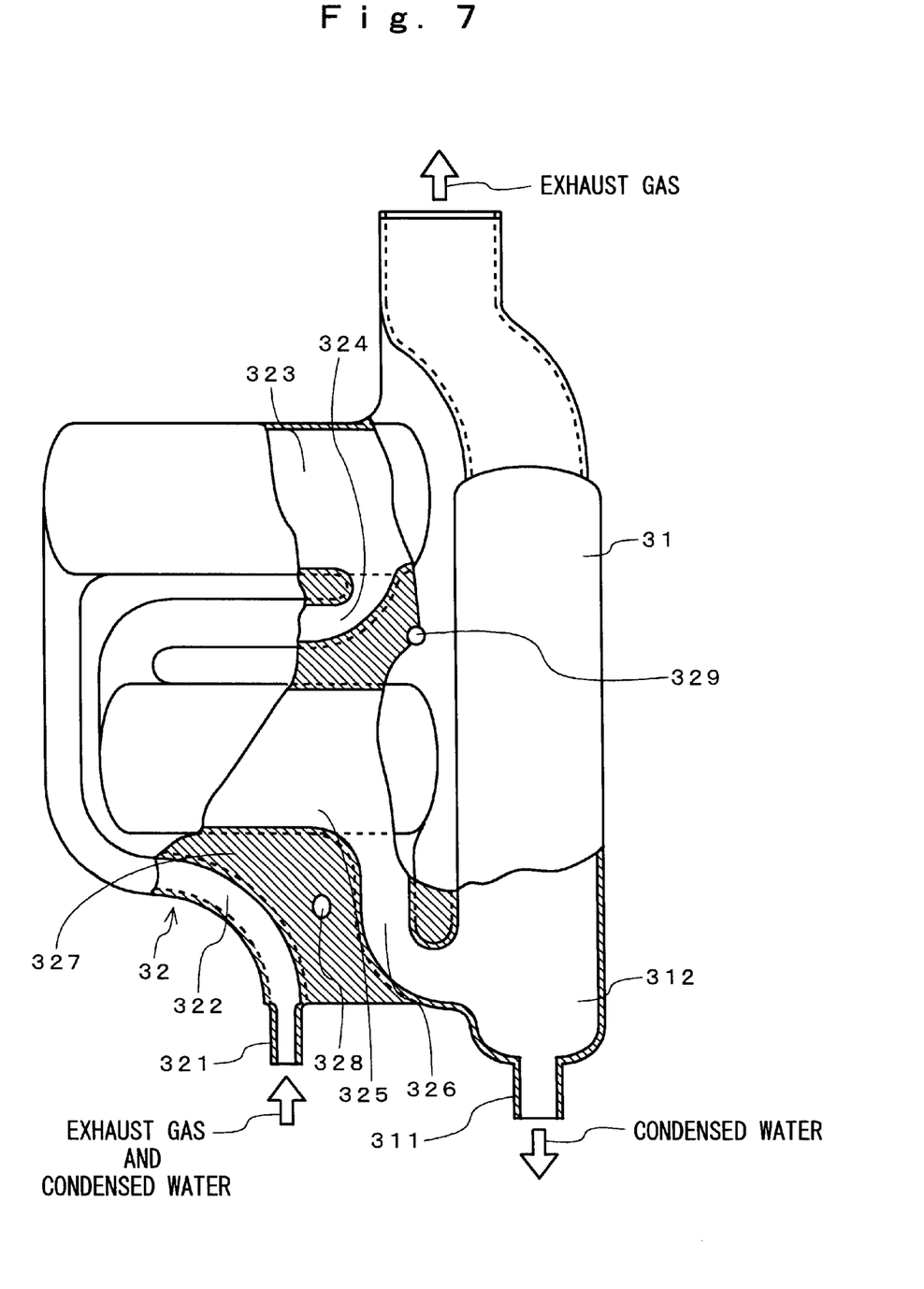
FIG. 7 is a cross sectional view showing a primary part of a silencer and a bend formed integral with the silencer.

FIG. 7 is a cross sectional view of a primary part of the exhaust heat recovering apparatus 1 showing the silencer 31 and the bent tube 32 provided at the inlet of the silencer 31. As shown, the bent tube 32 comprises a lift-up passage 322 of a relatively smaller size of the cross sectional area extending upwardly in an S curved form from its inlet end 321, a first expansion chamber 323 communicated to the upper end of the lift-up passage 322, a second expansion chamber 325 communicated to the lower end of the first expansion chamber 323 by a communication passage 324 having a larger size of the cross sectional area than the lift-up passage 322, and a fall-down passage 326 extending downwardly from the second expansion chamber 325. The first and the second expansion chambers 323 and 325 are arranged of a horizontally extending tubular form.

The fall-down passage 326 is larger than the lift-up passage 322 and the communication passage 324 in the cross sectional area, and is communicated with the silencer 31 at a lower region of its side wall. The lower end portion of the silencer 31 forms a separation chamber 312 where the condensed water is separated from the exhaust gas. The exhaust gas separated from the condensed water is discharged upwardly from the separation chamber 312. The outlet pipe 311 is provided at the lower end of the separation chamber 312. When the first expansion chamber 323 and the silencer 31 are communicated with each other with a rather large size passage for successfully retarding the conveying speed to accelerate the separation of the exhaust gas and the condensed water from each other, the second expansion chamber 325 may be eliminated.

The silencer 31 and the bent tube 32 may be formed integral with each other by resin molding. For simplifying the assembling, increasing the physical strength, and improving the installation, the silencer 31 and the bent tube 32 are separated and reinforced by a partition 327 of a sheet or film form. The partition 327 has bolt holes 328 and 329 provided therein for accepting bolts to tighten a block assembly of the silencer 31 and the bent tube 32 to the right side stay 30.

The silencer 31 and the bent tube 32 allows the exhaust gas mixed with the condensed water to be upwardly conveyed at a fast speed through out the lift-up passage 322 with rather smaller size (diameter) to the first expansion chamber 323. As the exhaust gas mixture is so quickly conveyed the generation of a blowing sound can be prevented, which sound may be generated due to the mixing of the exhaust gas with the condensed water when the mixture of the exhaust water and the condensed water slowly moves.

The mixture of the exhaust water and the condensed water is conveyed into the first expansion chamber 323 at very fast speed and collided with the inner wall of the chamber 323 and can thus be separated favorably from each other. The condensed water is then further conveyed to the communication passage 324 by the exhaust pressure of the gas and falls down by the gravity and the exhaust pressure of the gas to the separation chamber 312 where it is urged by the back pressure developed by the exhaust gas and forced into the drain passage or drain hose 35.

As apparent from the description, the present invention permits the exhaust gas mixed with the condensed water to be upwardly conveyed at once and then separated from the condensed water, hence inhibiting the generation of a blow up sound. Also, while the exhaust gas and the condensed water mixed are favorably separated from each other while running through the expansion chamber and the fall-down passage, the condensed water is forced into the drain passage with the back pressure developed by the exhaust gas and can thus be prevented from being directly discharged as mixed with the exhaust gas.

What is claimed is:

1. An engine waste heat recovering apparatus having an exhaust gas heat exchanger for recovering heat from the exhaust gas of the engine and a drain passage for discharging the condensed water produced due to the function of heat exchange in the exhaust gas heat exchanger, comprising:
   a lift-up passage extending upwardly from the exhaust gas heat exchanger;
   an expansion chamber communicated with an upper end of the lift-up passage;
   a fall-down passage extending downwardly from the expansion chamber; and
   an exhaust gas discharge passage communicated with a lower end of the fall-down passage extending upward, wherein the drain passage is communicated at its bottom.

2. An engine waste heat recovering apparatus according to claim 1, wherein the exhaust gas discharge passage is provided with a separation chamber communicated with a lower end of the fall-down passage at its bottom portion.

3. An engine waste heat recovering apparatus according to claim 1, wherein the fall-down passage is larger than the lift-up passage in a size of the cross sectional area.

4. An engine waste heat recovering apparatus according to claim 1, wherein the expansion chamber is of a horizontally extending tubular form and communicated at one end of its lower wall to an upper end of the lift-up passage and at the other end of its lower wall to an upper end of the fall-down passage.

5. An engine waste heat recovering apparatus according to claim 1, wherein the fall-down passage is communicated at its intermediate with a second expansion chamber, and a first passage between the second expansion chamber and the separation chamber is larger than a second passage between the expansion chamber and the second expansion chamber in a size of the cross sectional area.

6. An engine waste heat recovering apparatus according to claim 1, wherein the lift-up passage, the expansion chamber, the separation chamber, the exhaust gas discharge passage, and the fall-down passage are in an integral form.

7. An engine waste heat recovering apparatus according to claim 5, wherein the lift-up passage, the expansion chamber, the separation chamber, the exhaust gas discharge passage, the fall-down passage, and the second expansion chamber are in an integral form.

8. An engine waste heat recovering apparatus according to claim 1, wherein the drain passage includes a waster water trap.

* * * * *